United States Patent [19]

Lupi

[11] Patent Number: 5,595,170
[45] Date of Patent: Jan. 21, 1997

[54] PORTABLE MACHINES FOR PERFORMING CUTS IN STONE, MARBLE GRANITE AND THE LIKE

[76] Inventor: Quintilio Lupi, Via Flaminia, 138, Rignano Flaminio, Italy, 00068

[21] Appl. No.: 343,533

[22] PCT Filed: May 28, 1993

[86] PCT No.: PCT/IT93/00055

§ 371 Date: Nov. 29, 1994

§ 102(e) Date: Nov. 29, 1994

[87] PCT Pub. No.: WO93/24291

PCT Pub. Date: Dec. 9, 1993

[30] Foreign Application Priority Data

May 29, 1992 [IT] Italy .............................. RM92A0405

[51] Int. Cl.⁶ .................................................. B28D 1/02
[52] U.S. Cl. ...................... 125/12; 125/13.01; 451/344
[58] Field of Search ..................... 125/12, 13.01, 125/13.02; 451/344, 41, 357, 358, 342, 439, 353, 350

[56] References Cited

U.S. PATENT DOCUMENTS 2,700,256  1/1955  Lewis .......................... 451/344
5,086,750  2/1992  Chiuminatta et al. ............... 125/13.01
5,241,946  9/1993  Yelton et al. ..................... 125/13.01

*Primary Examiner*—Bruce M. Kisliuk
*Assistant Examiner*—Derris H. Banks
*Attorney, Agent, or Firm*—Evenson, McKeown, Edwards & Lenahan, P.L.L.C.

[57] ABSTRACT

A portable machine for performing cuts, particularly rectilinear or curvilinear cuts, in stone, marble, granite and the like. The machine comprises a supporting member arranged for movement over the top surface of stone or the like. A frame is connected to the supporting member through a connecting block. The frame supports motor means and transmission means for driving a cutting tool. A handle is provided for moving the machine over the surface of stone or the like. The machine comprises means for adjusting the sinking of the cutting tool into the stone. The supporting member being provided on the surface towards the stone with a plurality of rolling-ball bearings, allowing for the free movement of the supporting member. The frame and cutting tool are free to follow a rectilinear or curvilinear path. The connecting block cooperates with the coupling means for allowing a free rotation of the frame with respect to the supporting member.

13 Claims, 3 Drawing Sheets

PORTABLE MACHINES FOR PERFORMING CUTS IN STONE, MARBLE GRANITE AND THE LIKE

BACKGROUND AND SUMMARY OF THE INVENTION

The present invention relates to improvements in portable machines for performing cuts, particularly rectilinear and curvilinear cuts, in stone, marble, granite and the like.

Machines by which slabs of various materials are cut along a substantially arbitrary path that require the use of a template for guiding the machine itself on the cutting tool are well known in the art.

These known machines use as afore said a template for guiding the cutting tool, a diamond-wheel or the like, and if this is acceptable for mass production which entails a large number of machined pieces, this is absolutely unacceptable for single-piece operations both in respect of the set-up times and the costs for the preparation of the templates. This is particularly true when these operations are carried out by a craftsman who should change the template for each machining operation.

Presently, small machines for cutting stone, marble and the like, are known. However, even if they are reasonably light and convenient, cuts on millings along arbitrary curvilinear path with the required precision can not be performed.

It would be therefore particularly advantageous to provide a portable machine by which it is possible to follow an arbitrary cutting path either rectilinear or curvilinear, allowing the manual guidance of the cutting tool with a great ease and without the need of using a template.

The portable machine according to the present invention basically comprises a frame connected to a supporting member carrying the machine over a slab of stone or the like to be machined, the frame carrying a motor for driving the cutting or milling tool and a handle for guiding the machine and the tool along a desired working path.

The supporting member carrying the machine over the slab to be machined is provided on the surface faring the slab with a plurality of rolling ball bearings having a low friction coefficient so as to allow the user to operate easily the machine over the top surface of the slab to be machined.

In the known machines of this kind, however, the frame of the machine and the member supporting the same over the surface of the slab to be machined are angularly fixed both in azimuth and elevation and for this reason the shifting of the machine over the surface of the slab to be machined is rather difficult. Moreover, if with a machine of the known type it is desired to mill agroove with a variable depth or width, for instance for machining recesses for inlay works, such operation would be very difficult and even at all impossible.

U.S. Pat. No. 1,542,127 discloses improvements in sawing machines in which a toothed cutting blade is moved reciprocatively and in which it is possible to guide the saw blade between lubricated blocks adjustable in the base. Further, means are provided to adjust the length of the stroke of the saw that allows to adjust consequently the depth of penetration of the blade into a work piece. Also provided is a supporting member with a plurality of rolling ball bearings allowing the free movement of the supporting member over the workpiece.

GB-A-0 810 682 discloses an apparatus for cutting grooves in brickworks, comprising an electric motor mounted on a trolley driving through gearing a horizontal cutter or disc for cutting a slot in a wall. The trolley carries castors associated to means for the adjustment of the height at which the slot is to be cut, further and the depth of the cut is controlled by an adjustable fender mounted on the trolley.

The object of the present invention is therefore to provide a portable machine for cutting and/or milling slab materials such as stone in general, marble, granite and the like, by which it is possible to overcome the above disadvantages and to perform cuts and/or millings of any depth and following any path or contour with a minimum effort by the operator.

According to the invention, the member supporting the machine over the surface to be machined is rendered freely movable but connected to the frame of the machine carrying the motor and the cutting tool, while a guide handle allows to guide the frame itself, and thus the machine, with both hands, thus decreasing the effort of the operator while permitting to follow any path for cutting or milling the slab to be machined, without using a template.

According to the invention, the frame of the machine cooperates with the supporting member through a swivel connection device having more than a single degree of freedom that allows to displace in azimuth the supporting member with respect to the cutting tool and to adjust the slant angle of the same, and the sinking of the cutting tool into the slab to be machined.

According to the invention, a portable machine is provided for performing cuts, particularly rectilinear or curvilinear cuts, in stone, marble, granite and the like, which comprises:

- a supporting member arranged for movement over the top surface of a stone or the like to be machined;
- a frame connected to the supporting member through a connecting block, the frame supporting motor means and transmission means for driving a cutting tool;
- a handle for moving the machine over the surface of stone or the like to be machined; and
- means for adjusting the sinking of the cutting tool into the stone, the supporting member being provided on the surface towards the stone with a plurality of rolling-ball bearings to allow the free movement of the supporting member, frame and cutting tool for following a rectilinear or curvilinear path,
- the connecting block cooperating with coupling means for allowing a free rotation of the frame with respect to the supporting member.

BRIEF DESCRIPTION OF THE DRAWINGS

The present invention will be better understood, and other features and characteristics will be apparent upon reading of the following specification considered together with the figures of the attached drawings, wherein.

DETAILED DESCRIPTION OF THE DRAWINGS

Figure 1:
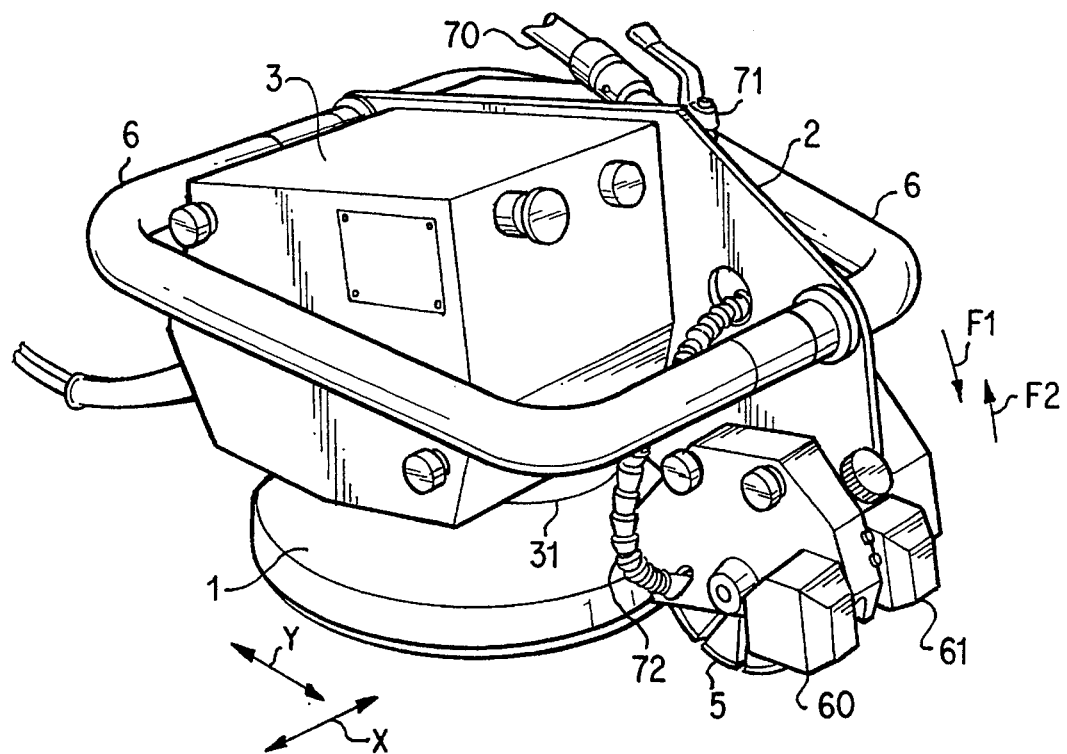
FIG. 1 shows an elevation view from the side of the motor of the machine.
Figure 2:
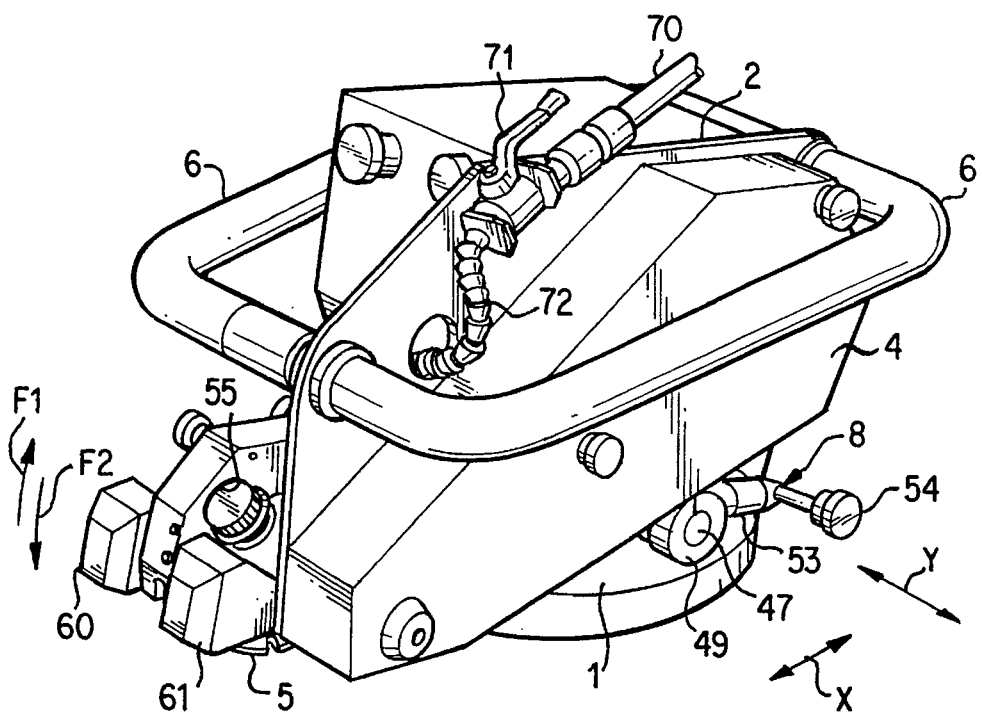
FIG. 2 is an elevation view from a side substantially opposite to that of FIG. 1.

With reference to the drawings and in particular to FIGS. 1 and 2, the machine according to the present invention comprises a supporting member 1 free to travel over the top surface of the slab to be machined (not shown), which is connected to a frame 2 carrying the various components of the machine, and a handle 6 for guiding the machine over the slab.

The supporting member 1 abuts over the top surface of the slab to be machined by means of a plurality of rolling-ball or swivel elements as it will be better shown hereinafter with reference to FIG. 3.

Referring again to FIGS. 1 and 2, the frame 2 carries a motor under a protection cover 3 and a belt transmission under a protection cover 4 which trough pulleys drives the cutting tool 5. A connection member 7 between the supporting member 1 and the frame 2 is provided. As it will be hereinafter seen, a control lever generally shown in 8 allows the locking and unlocking of a coupling joint located in the connection member, between the supporting member 1 and the frame 2, as it will be discussed below.

Figure 3:
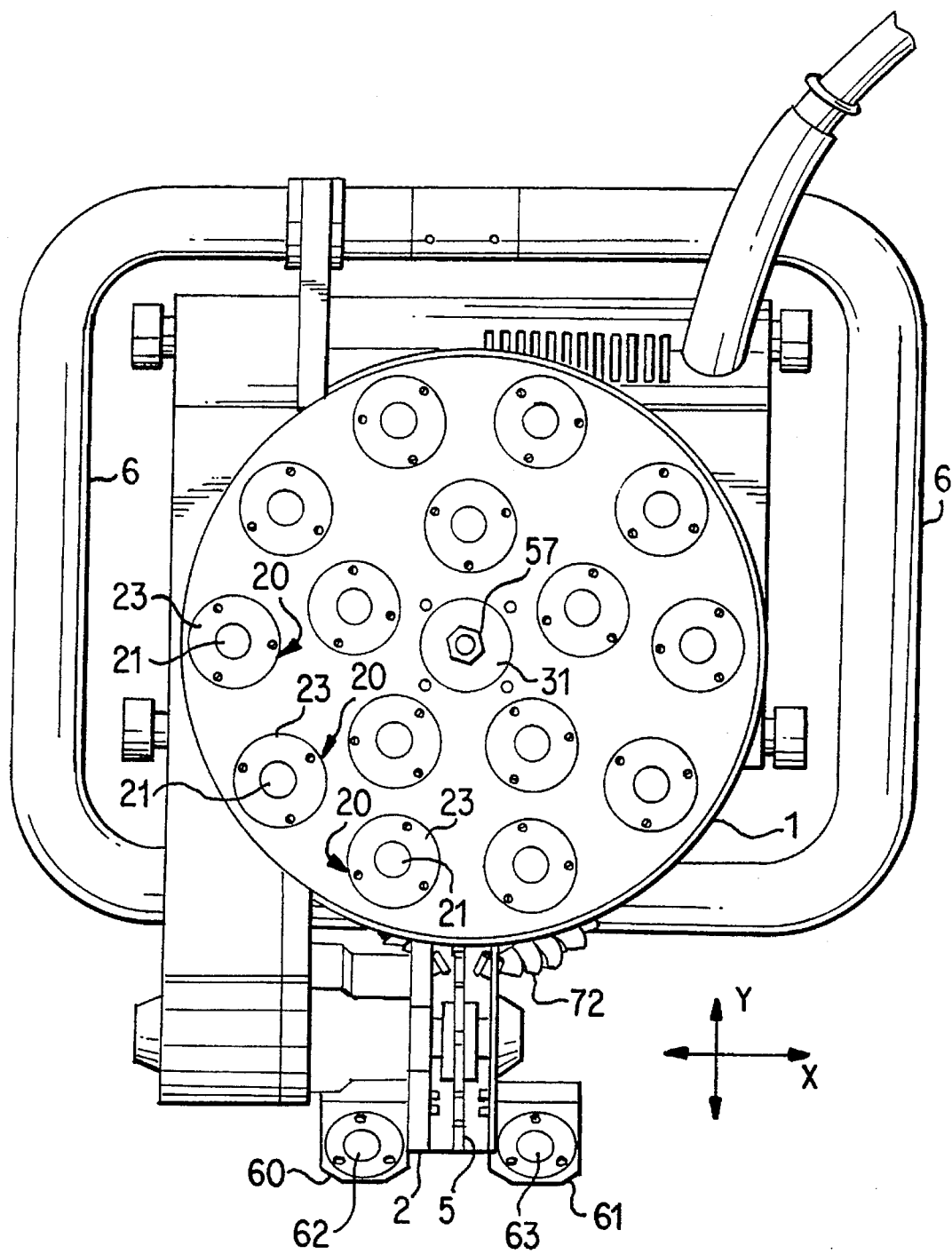
FIG. 3 is a bottom view of the machine shown in FIGS. 1 and 2.

As it can be seen in FIG. 3, the supporting member 1 is provided on its side facing the slab to be machined with a plurality of rolling-ball bearings 20 of a known type comprising a ball 21 retained by a ring 23.

These rolling-ball bearings 20 allow a very easy movement of the machine carried by the supporting member along the X, Y axes shown in FIG. 3. It should be noted that a typical machine of this kind may weight about 45–50 kg (100–120 lbs).

The supporting member 1 is shown as having a circular shape. Such shape is convenient but should be considered only as a non limiting example.

Figure 4:
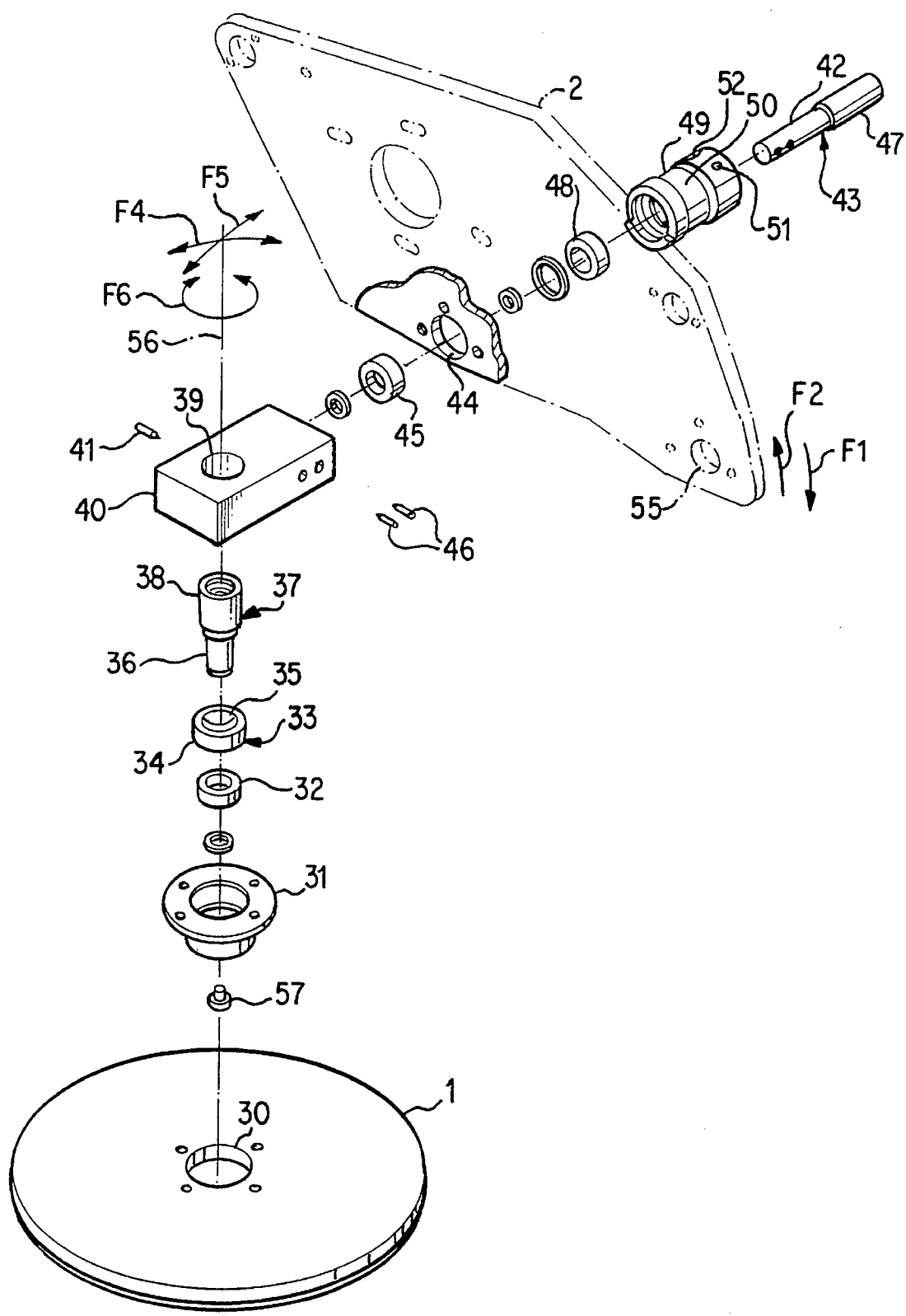
FIG. 4 is an exploded view of the connecting mechanism between the supporting member and the frame of the machine.

With reference now to FIG. 4, the connecting structure between the supporting member 1 and the frame 2 of the machine will be described into detail.

The supporting member is provided with a seat 30 arranged for accomodating a housing 31 that receives a ball bearing 32 and a spherical seat-and-ball joint 33 having an outer race 34 and a ball member 35.

In a known manner, the ball member 35 receives the stem 36 of a coupling shaft 37 having a head 38 that is received into a seat 39 of a connecting block 40. The head 38 is retained in the seat 39 by means of a set screw 41. The connecting block 40 that performs the actual connection between the supporting member 1 and the frame 2 is arranged for housing the stem 42 of a shaft 43 passing through the opening 44 of the frame 2 for fastening to block 40 which also houses a bearing bushing 45.

The stem 42 of the shaft 43 is retained by means of the two set-screws 46. The shaft 43 is provided with a head 47 that through a bearing or bushing 48 cooperates with a split sleeve 49 having a cut 50 and threaded holes 51, 52 that cooperate with a locking bolt 53 and a lever 54 (FIG. 2)).

The set of parts from 40 to 54 allows the coupling to be unlocked between the block 40 and the frame 2 in order to allow a rocking movement of the frame 2 with respect to the supporting member 1 as shown by the arrows F1, F2, in order to modify at will the "sinking" of the cutting tool 5 located in correspondence with the seat 55 in the frame 2.

The set of parts 31 to 38 and seat 39 arranged between the supporting member 1 and the connecting block 40 allows a limited angular displacement of the axis 56 around which the connecting block 40 and hence the frame 2 may rotate with respect to the supporting member 1 and consequently with respect to the work piece (not shown) i.e. the stone or marble slab to be cut or milled.

The presence of the spherical seat-and-ball joint 33 allows a limited tilting of the block 40 and consequently of the frame 2, and of the tool 5 (in the position 55) so that a limited slant angle may be given to the tool 5 (a diamond-coated disk cutter) with respect to the work piece for better following particular curvilinear paths for cutting or milling the slab of stone.

Positioning according to the arrows F4, F5 is set by hand and is fixed by means of a set screw 57 co-operating with the bottom of the housing 31 and the bottom end of the shaft 37.

It should be noted that, when the machine is moved over the slab of stone or marble to be machined, by acting with the hands on the handle 6 the frame 2 together with the handle 6 is free to rotate with respect to the supporting member 1, as shown by the arrow F6, thanks to the joint 33 and the ball bearing 32. This feature is provided since the rolling-ball bearings 20 usually do not allow an entirely free rotation of the supporting member 1 over the surface of the slab to be machined. In this way, any danger of scratching a polished surface of the stone or marble slab is avoided.

In FIGS. 1, 2 and 3, there are shown two blocks 60, 61 arranged for limiting the displacement of the frame 2 when adjusting the "sinking" of the tool 5 into the stone being machined. The blocks 60, 61 are provided on the underside with bearings 62, 63 similar to the bearings 23 located on the underside of the supporting member 1.

Further, as it is shown in FIGS. 1 and 2, there is provided a hose 70, coupled to a valve 71 and to a tube 72 for applying to the tool 5 a jet of cooling fluid (e.g. water).

What is claimed is:

1. A portable machine for cutting stone, marble and granite, comprising:

a supporting member arranged for movement over a surface of a stone to be cut;

a connecting block rotatably connected to said supporting member about a first axis of rotation which is generally perpendicular to said surface of the stone;

a plurality of rolling-ball bearings arranged on said supporting member to engage said surface of the stone;

a frame connected to the connecting block, said frame being rotatable along with said connecting block with respect to said supporting member, said frame supporting a motor and a transmission;

a cutting tool connected to the frame, said cutting tool being rotatable along with said frame and said connecting block with respect to said supporting member; and a handle operatively connected to the frame to guide the cutting tool along a rectilinear or curvilinear path on said surface of the stone, said handle being rotatable along with said frame, said connecting block, and said cutting tool with respect to said supporting member.

2. A portable machine according to claim 1, further comprising means for adjusting a cutting depth of the cutting tool.

3. A portable machine according to claim 1, wherein said frame is rotatably connected to the connecting block about a second axis of rotation which is generally parallel to said surface of the stone, and wherein said frame, said cutting tool, and said handle are rotatable about said second axis of rotation to adjust a cutting depth of the cutting tool.

4. A portable machine according to claim 3, further comprising locking means for maintaining a preset cutting depth of the cutting tool.

5. A portable machine according to claim 4, further comprising means for limiting the cutting depth of the cutting tool.

6. A portable machine according to claim 5, wherein the means for limiting the cutting depth are provided with a plurality of rolling-ball bearings to engage said surface of the stone.

7. A portable machine according to claim 3, further comprising a seat-and-ball joint operatively connected between the supporting member and the connecting block, said seat-and-ball joint being configured to allow the connecting block to be tilted with respect to the supporting member about the first axis of rotation in order to tilt an axis of rotation of said cutting tool with respect to said surface of the stone.

8. A portable machine according to claim 7, further comprising locking means for maintaining a preset cutting depth of the cutting tool.

9. A portable machine according to claim 8, further comprising means for limiting the cutting depth of the cutting tool.

10. A portable machine according to claim 9, wherein the means for limiting the cutting depth are provided with a plurality of rolling-ball bearings to engage said surface of the stone.

11. A portable machine according to claim 1, further comprising a seat-and-ball joint operatively connected between the supporting member and the connecting block, said seat-and-ball joint being configured to allow the connecting block to be tilted with respect to the supporting member about the first axis of rotation in order to tilt an axis of rotation of said cutting tool with respect to said surface of the stone.

12. A portable machine according to claim 1, wherein the cutting tool is a disk-shaped diamond coated tool.

13. A portable machine according to claim 1, wherein means are provided for applying a cooling fluid to the cutting tool.

* * * * *